(12) United States Patent
Brodjonegoro et al.

(10) Patent No.: US 12,378,639 B2
(45) Date of Patent: Aug. 5, 2025

(54) PROCESS AND SYSTEM FOR RECOVERING MANGANESE FROM HIGH-PRESSURE LEACHING SYSTEM OF LATERITE NICKEL ORE

(71) Applicants: PT ESG NEW ENERGY MATERIAL, Jakarta (ID); PT QMB NEW ENERGY MATERIALS, Jakarta (ID); GEM CO., LTD., Shenzhen (CN); PT GEM INDONESIA NEW ENERGY MATERIALS, Jakarta (ID)

(72) Inventors: Satryo Soemantri Brodjonegoro, Jakarta (ID); Kaihua Xu, Shenzhen (CN); Evan Wahyu Kristiyanto, Jakarta (ID); Nurul Lailatul Muzayadah, Jakarta (ID); Tegar Mukti Aji, Jakarta (ID); Andi Syaputra Hasibuan, Jakarta (ID); Rizky Wanaldi, Jakarta (ID); Tao Cui, Jakarta (ID)

(73) Assignees: PT ESG NEW ENERGY MATERIAL, Jakarta (ID); PT QMB NEW ENERGY MATERIALS, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 0 days.

(21) Appl. No.: 18/870,422
(22) PCT Filed: Jul. 31, 2023
(86) PCT No.: PCT/CN2023/110214
§ 371 (c)(1),
(2) Date: Nov. 28, 2024

(87) PCT Pub. No.: WO2025/025052
PCT Pub. Date: Feb. 6, 2025

(65) Prior Publication Data
US 2025/0171878 A1    May 29, 2025

(51) Int. Cl.
$C22B\ 47/00$   (2006.01)
$C22B\ 3/00$    (2006.01)
(Continued)

(52) U.S. Cl.
CPC ............... $C22B\ 47/00$ (2013.01); $C22B\ 3/02$ (2013.01); $C22B\ 3/26$ (2021.05); $C22B\ 3/44$ (2013.01); $C22B\ 23/0407$ (2013.01)

(58) Field of Classification Search
None
See application file for complete search history.

(56) References Cited

FOREIGN PATENT DOCUMENTS

| CN | 103122409 A | * | 5/2013 |
| CN | 109777954 A | * | 5/2019 |

(Continued)

OTHER PUBLICATIONS

Lin, Q., et al. Preparation of manganese sulfate from low-grade manganese carbonate ores by sulfuric acid leaching. Int. J. Miner. Metall. Mater., vol. 23, No. 5, 2016. (Year: 2016).*

(Continued)

*Primary Examiner* — Anthony J Zimmer
*Assistant Examiner* — Zachary John Baum
(74) *Attorney, Agent, or Firm* — Hemisphere Law, PLLC; Zhigang Ma

(57) ABSTRACT

A process and system for recovering manganese from a high-pressure leaching system of laterite nickel ore, including the following steps: S1. adding limestone to the high-pressure leaching solution of the laterite nickel ore for pre-neutralization to obtain first-stage carbon dioxide and a neutralization solution, adding limestone for precipitation of iron and aluminum to obtain second-stage carbon dioxide and a slurry, and adding liquid alkali to the slurry for precipitation of nickel-cobalt-manganese to obtain nickel-cobalt-manganese hydroxide and a nickel-cobalt-manganese (Continued)

precipitated lean solution; S2. collecting first-stage carbon dioxide and second-stage carbon dioxide and passing same into a nickel-cobalt-manganese precipitated lean solution, adjusting the pH value of the nickel-cobalt-manganese precipitated lean solution to 5-6.5 by liquid alkali, and then performing a precipitation reaction to obtain a crude manganese carbonate; S3. dissolving the crude manganese carbonate with sulfuric acid to obtain a dissolution liquid and third-stage carbon dioxide, then removing calcium and magnesium from the dissolution liquid to obtain a manganese sulfate solution and then evaporating and crystallizing to obtain manganese sulfate crystals; recycling the third-stage carbon dioxide and introducing same into a nickel-cobalt-manganese precipitated lean solution; the recovery rate and utilization rate of manganese is high, and the carbon emission from laterite nickel ore leaching process is reduced.

8 Claims, 3 Drawing Sheets

(51) Int. Cl.
*C22B 3/02* (2006.01)
*C22B 3/26* (2006.01)
*C22B 3/44* (2006.01)

(56) References Cited

FOREIGN PATENT DOCUMENTS

| | | | |
|---|---|---|---|
| CN | 110331283 A | 10/2019 | |
| CN | 116497219 A * | 7/2023 | ......... C22B 23/0461 |
| WO | WO-2009155634 A1 * | 12/2009 | ......... C22B 23/0407 |

OTHER PUBLICATIONS

English translation of CN-116497219-A Description. (Year: 2023).*
English translation of CN-103122409-A Description. (Year: 2013).*
English translation of CN-109777954-A Description. (Year: 2019).*
Claims of PCT/CN2023/110214.
CNIPA (ISA), Written opinion for PCT/CN2023/110214, Dec. 8, 2023.

* cited by examiner

PROCESS AND SYSTEM FOR RECOVERING MANGANESE FROM HIGH-PRESSURE LEACHING SYSTEM OF LATERITE NICKEL ORE

FIELD OF THE DISCLOSURE

The disclosure relates to the technical field of manganese recovery, and more particularly to a process and system for recovering manganese from a high-pressure leaching system of laterite nickel ore.

BACKGROUND

In the high-pressure leaching process system of laterite nickel ore, nickel and cobalt are selectively leached in the high-temperature and high-pressure leaching environment, and the associated valuable metals such as Mn, Mg, and Cr in the raw ore can also be dissolved into the leaching solution. Among them, Mn also has a recycling value as a main metal element of the ternary lithium-ion battery. The laterite nickel ore raw ore is treated by the process of "beneficiation pretreatment-high pressure leaching-preneutralization-CCD washing-iron and aluminum removal-nickel cobalt manganese precipitation" successively in order to prepare the product nickel-cobalt-manganese hydroxide and achieve the purpose of manganese recovery.

However, since the pH of the solution for precipitation of nickel-cobalt-manganese is between 7 and 8, the pH of the hydroxide formed by precipitation of Mn using alkali needs to exceed 8.6, so that the Mn content in the product nickel-cobalt-manganese hydroxide is lower, about (6-9%) compared to Ni. About 1.3 g/L of Mn remains in the liquid phase, which is directly discharged to pollute the environment and will increase production costs through wastewater treatment plant.

Therefore, it is necessary to design a scheme to recover the Mn from the nickel-cobalt-manganese lean solution, to improve the economic efficiency, and to make the wastewater meet the discharge and reuse standards.

SUMMARY

In view of this, the disclosure provides a process and system for recovering manganese from a high-pressure leaching system of laterite nickel ore, wherein the recovery rate and utilization rate of manganese are high, and the carbon emission of the leaching process of laterite nickel ore is reduced.

In order to achieve the above technical object, the disclosure adopts the following technical solutions:

In a first aspect, the disclosure provides a method for recovering manganese from a high-pressure leaching system of laterite nickel ore, including the following steps:

S1. Adding limestone to the high-pressure leaching solution of the laterite nickel ore for preneutralization to obtain first-stage carbon dioxide and a neutralization solution, adding limestone in the neutralization solution for precipitation of iron and aluminum to obtain second-stage carbon dioxide and a slurry, and adding liquid alkali to the slurry for precipitation of nickel-cobalt-manganese to obtain nickel-cobalt-manganese hydroxide and a nickel-cobalt-manganese precipitated lean solution;

S2. Collecting first-stage carbon dioxide and second-stage carbon dioxide and passing same into a nickel-cobalt-manganese precipitated lean solution, adjusting the pH value of the nickel-cobalt-manganese precipitated lean solution to 5-6.5 by using liquid alkali, and then performing a precipitation reaction to obtain a crude manganese carbonate; and S3. Dissolving the crude manganese carbonate by using sulfuric acid to obtain a dissolution liquid and third-stage carbon dioxide, then removing calcium and magnesium from the dissolution liquid to obtain a manganese sulfate solution and then evaporating and crystallizing to obtain manganese sulfate crystals; recycling the third-stage carbon dioxide and introducing same into a nickel-cobalt-manganese precipitated lean solution.

Preferably, in step S3, the step of removing calcium and magnesium is as follows:

S31. Adding an extractant into the dissolution liquid to perform counter-current extraction, and separating to obtain a loaded organic phase, and after washing with a first sulfuric acid to obtain a first organic phase and a calcium sulfate solution;

S32. Reverse extracting the first organic phase with a second sulfuric acid to obtain a second organic phase and a magnesium sulfate solution; and S33. Reverse extracting the second organic phase again with a third sulfuric acid to obtain a manganese sulfate solution and a fourth organic phase; recycling the fourth organic phase and passing the same into the dissolution liquid.

Preferably, the extractant includes one or more of P507, P204, Cyanex272, Cyanex923, TBP, and P350.

Preferably, the concentration of the first sulfuric acid is from 0.03 to 0.05 mol/L, the concentration of the second sulfuric acid is from 0.8 to 1.0 mol/L, and the concentration of the third sulfuric acid is from 1.5 to 1.8 mol/L.

Preferably, in step S1, the pH of the liquid phase after the counter-current extraction is 3-4.

Preferably, prior to the counter-current extraction, further including saponifying the extractant.

Preferably, the pH of the nickel-cobalt-manganese precipitated lean solution in step S1 is 7-8.

Preferably, the precipitation reaction time is 30 to 60 min.

In a second aspect, the disclosure provides a system for recovering manganese from a high-pressure leaching system of laterite nickel ore, including a carbon dioxide storage tank and a preneutralization tank, an iron-aluminum precipitation tank, a nickel-cobalt-manganese precipitation tank, a first reaction tank, a second reaction tank, a filter pressing device and a dissolution and impurity removal tank connected in sequence; the carbon dioxide storage tank is connected to the preneutralization tank via a first-stage carbon dioxide delivery pipeline, the carbon dioxide storage tank is connected to the iron-aluminum precipitation tank via a second-stage carbon dioxide delivery pipeline, the carbon dioxide storage tank is connected to the dissolution and impurity removal tank via a third-stage carbon dioxide delivery pipeline, the carbon dioxide storage tank is connected to the first reaction tank via a first carbon dioxide delivery pipeline, and the carbon dioxide storage tank is connected to the second reaction tank via a second carbon dioxide delivery pipeline; the first carbon dioxide delivery pipeline is provided with a first control valve for controlling the delivery flow rate of carbon dioxide, the second carbon dioxide delivery pipeline is provided with a second control valve for controlling the delivery flow rate of carbon dioxide, and a third control valve for controlling the delivery flow rate of the nickel-cobalt-manganese precipitated lean solution is provided between the nickel-cobalt-manganese precipitation tank and the first reaction tank.

Preferably, a first pH online monitoring instrument, a first 3S-CL-Mn manganese ion online analyzer, and a first liquid alkali automatic adding instrument are externally connected to the first reaction tank, and a second pH online monitoring instrument, a second 3S-CL-Mn manganese ion online analyzer, and a second liquid alkali automatic adding instrument are externally connected to the second reaction tank; the first liquid alkali automatic adding instrument and the second liquid alkali automatic adding instrument are provided with valves for controlling the delivery flow rate of the liquid alkali.

The advantageous effects of the disclosure are as follows:
1. Combined with the carbon dioxide produced in the laterite nickel ore line, this scheme can be used to recover the higher Mn in the nickel-cobalt-manganese precipitated lean solution, reduce the carbon emission of the whole process, produce green, and have significant economic benefits;
2. In this scheme, manganese carbonate by-product can be produced in the nickel-cobalt-manganese precipitated lean solution with high purity and high recovery rate;
3. This scheme reduces the difficulty of treating wastewater in the laterite nickel ore production line. Compared with only using pH control to remove manganese, this scheme has a better sedimentation effect and consumes less neutralizer.

DETAILED DESCRIPTION OF PREFERRED EMBODIMENTS

In order that the objects, aspects, and advantages of the disclosure will become more apparent, a more particular description of the invention will be rendered by reference to specific embodiments thereof. It should be understood that the particular embodiments described herein are illustrative only and are not limiting.

Figure 1:
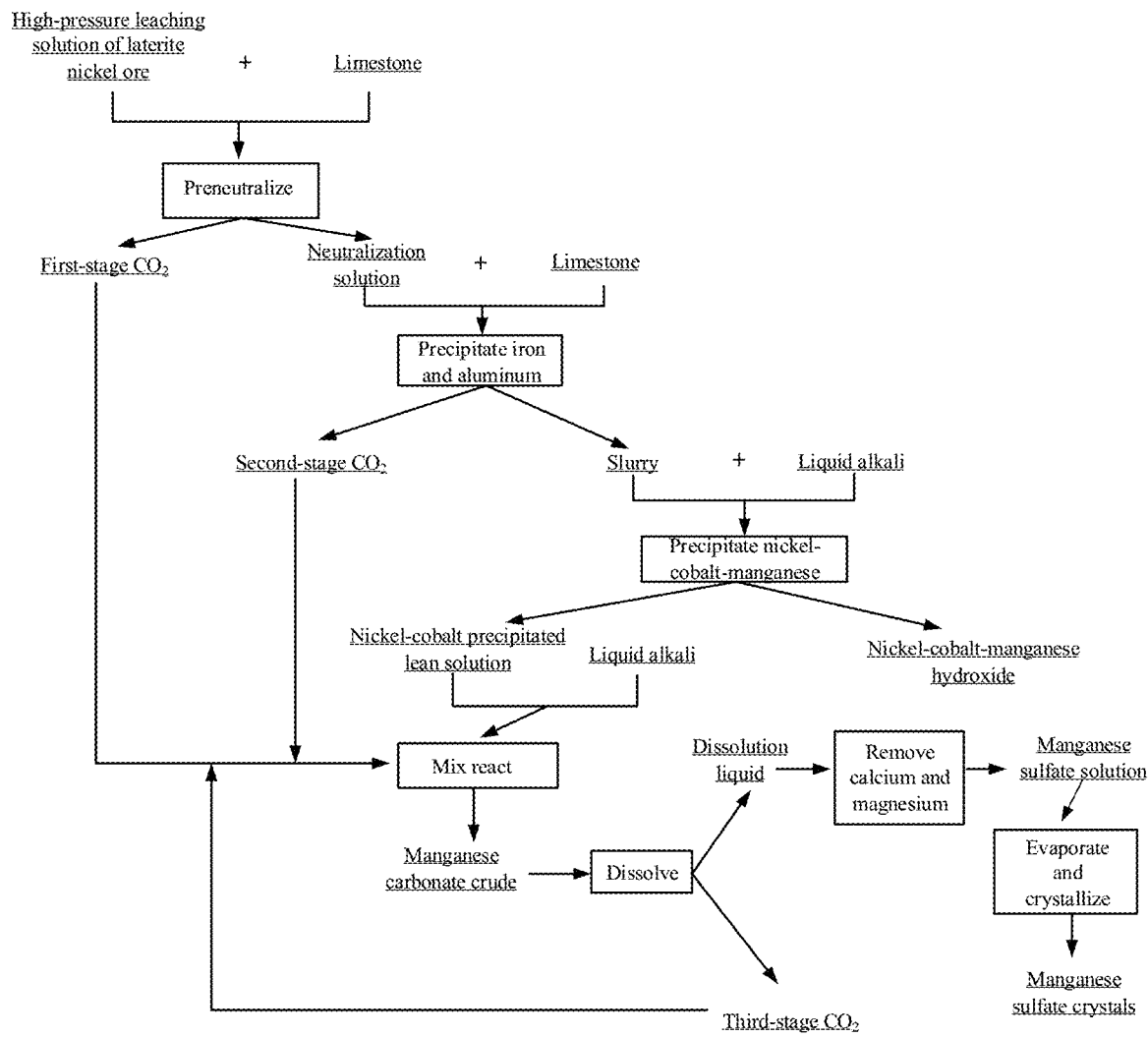
FIG. 1 is a process flowchart of the present scheme.

As shown in FIG. 1, the disclosure provides a method for recovering manganese from a high-pressure leaching system of laterite nickel ore, including the following steps:
S1. Adding limestone to the high-pressure leaching solution of the laterite nickel ore for preneutralization to obtain first-stage carbon dioxide and a neutralization solution, adding limestone in the neutralization solution for precipitation of iron and aluminum to obtain second-stage carbon dioxide and a slurry, and adding liquid alkali to the slurry for precipitation of nickel-cobalt-manganese to obtain nickel-cobalt-manganese hydroxide and a nickel-cobalt-manganese precipitated lean solution;
S2. Collecting first-stage carbon dioxide and second-stage carbon dioxide and passing same into a nickel-cobalt-manganese precipitated lean solution, adjusting the pH value of the nickel-cobalt-manganese precipitated lean solution to 5-6.5 by using liquid alkali, and then performing a precipitation reaction to obtain a crude manganese carbonate; and
S3. Dissolving the crude manganese carbonate by using sulfuric acid to obtain a dissolution liquid and third-stage carbon dioxide, then removing calcium and magnesium from the dissolution liquid to obtain a manganese sulfate solution and then evaporating and crystallizing to obtain manganese sulfate crystals; recycling the third-stage carbon dioxide and introducing same into a nickel-cobalt-manganese precipitated lean solution.

In the production of nickel-cobalt-manganese hydroxide system by the whole leaching process of laterite nickel ore, limestone is added to consume residual acid and adjust the pH of the solution in the process of preneutralization and precipitation of iron and aluminum, while a large amount of greenhouse gas carbon dioxide will be generated with the consumption of limestone. The carbon dioxide gas generated in the two parts of steps is recovered and introduced into the lean solution of precipitated nickel cobalt manganese, and then in cooperation with liquid alkali to control and maintain the pH value of the nickel-cobalt-manganese precipitated lean solution at 5-6.5 and the precipitation reaction at 30 to 60 min, white precipitated manganese carbonate will appear, while most of Mg stays in the liquid phase to be removed. Higher purity by-product crude manganese carbonate is obtained.

After the above-mentioned steps, the manganese content in the crude manganese carbonate is relatively high, but there are still a small amount of Ca and Mg impurities, wherein the Ca impurity accounts for about 24% and the Mg impurity accounts for about 1-2%. In order to further purify the manganese carbonate, this scheme also removes the calcium and magnesium in the crude manganese carbonate.

Figure 2:
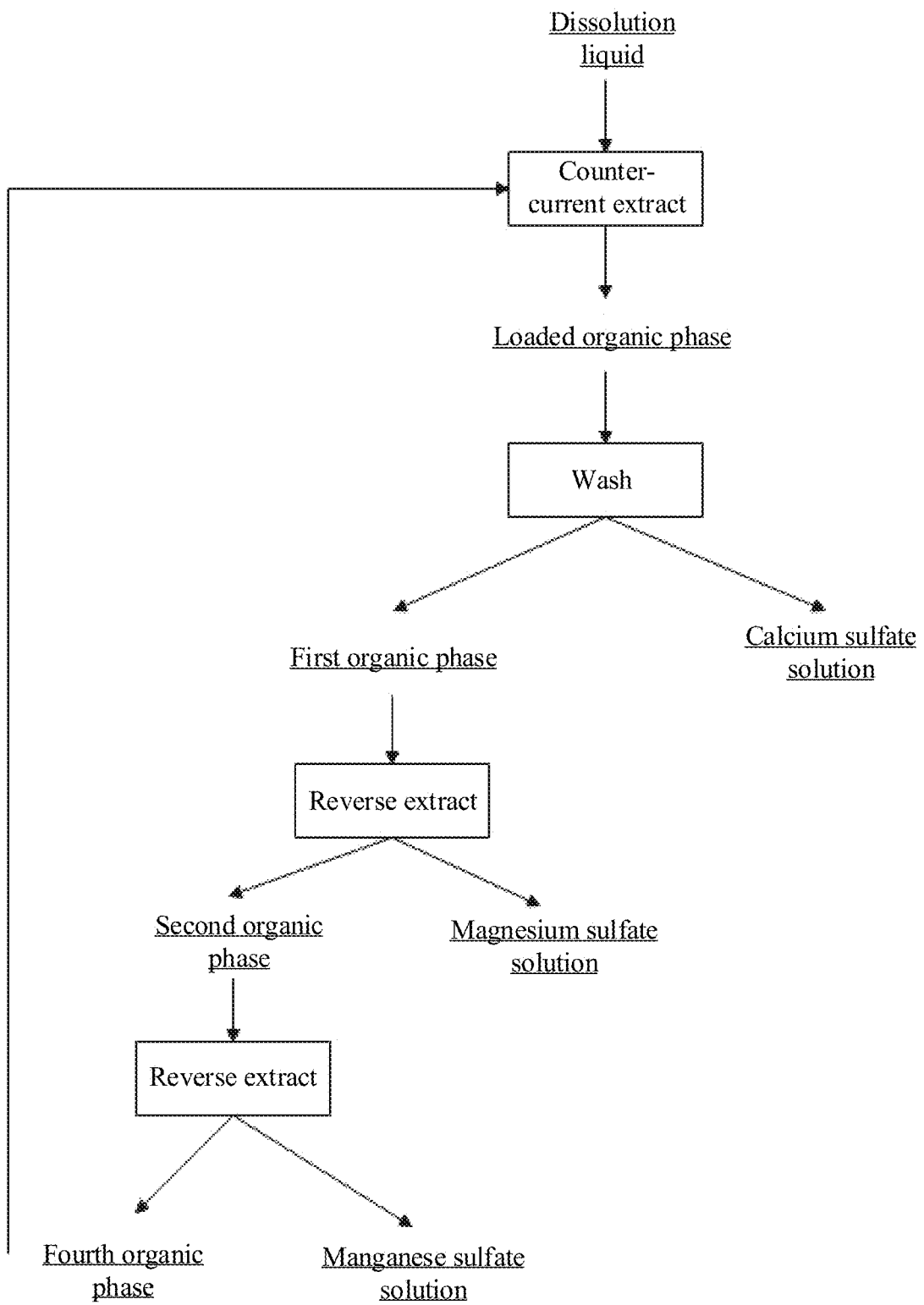
FIG. 2 is a process flowchart for removing calcium and magnesium.

As shown in FIG. 2, in step S3, the step of removing calcium and magnesium is as follows.
S31. Adding an extractant into the dissolution liquid to perform counter-current extraction, and separating to obtain a loaded organic phase, and after washing with a first sulfuric acid to obtain a first organic phase and a calcium sulfate solution;
S32. Reverse extracting the first organic phase with a second sulfuric acid to obtain a second organic phase and a magnesium sulfate solution; and
S33. Reverse extracting the second organic phase again with a third sulfuric acid to obtain a manganese sulfate solution and a fourth organic phase; recycling the fourth organic phase and passing the same into the dissolution liquid.

The dissolution liquid is extracted and enriched with manganese by extraction with an extractant. After three-stage counter-current extraction, the loaded organic phase is washed with first sulfuric acid to remove Ca, then the first organic phase is reverse extracted with second sulfuric acid to selectively remove Mg, and finally, the second organic phase is reverse extracted with third sulfuric acid to remove Mn. Finally, the obtained manganese sulfate solution has almost no calcium and magnesium impurities.

Extractants include one or more of P507, P204, Cyanex272, Cyanex923, TBP, and P350.

The concentration of the first sulfuric acid is from 0.03 to 0.05 mol/L, suitably but without limitation, the concentration of the first sulfuric acid is 0.03 mol/L, 0.04 mol/L, 0.05 mol/L; the concentration of the second sulfuric acid is from 0.8 to 1.0 mol/L, suitably but not limiting, the concentration of the second sulfuric acid is from 0.8 mol/L, 0.9 mol/L, 1.0 mol/L and the concentration of the third sulfuric acid is from 1.5 to 1.8 mol/L, suitably but not limiting, the concentration of the third sulfuric acid is from 1.5 mol/L, 1.6 mol/L, 1.8 mol/L.

Prior to the counter-current extraction, saponification of the extractant is also included.

In step S1, the pH of the liquid phase after the counter-current extraction is 3-4, which depends on the pH value of the extractant after saponification, and the pH value of the extractant after saponification in the disclosure is 3-4.

In step S1, the pH value of the nickel-cobalt-manganese precipitated lean solution is 7-8; in order to optimize the nickel-cobalt precipitation, the pH of the slurry is adjusted to 7-8 by liquid alkali.

The precipitation reaction time is 20 to 30 min.

The disclosure provides a system for recovering manganese from a high-pressure leaching system of laterite nickel ore, including a carbon dioxide storage tank 8, and a preneutralization tank 1, an iron-aluminum precipitation tank 2, a nickel-cobalt-manganese precipitation tank 7, a first reaction tank 3, a second reaction tank 4, a filter pressing device 5 and a dissolution and impurity removal tank 6 which are connected in sequence; the carbon dioxide storage tank 8 is connected to the preneutralization tank 1 via first-stage carbon dioxide delivery pipeline, the carbon dioxide storage tank 8 is connected to the iron-aluminum precipitation tank 2 via a second-stage carbon dioxide delivery pipeline, the carbon dioxide storage tank 8 is connected to the dissolution and impurity removal tank 6 via a third-stage carbon dioxide delivery pipeline, the carbon dioxide storage tank 8 is connected to the first reaction tank 3 via a first carbon dioxide delivery pipeline, and the carbon dioxide storage tank 8 is connected to the second reaction tank 4 via a second carbon dioxide delivery pipeline; the first carbon dioxide delivery pipeline is provided with a first control valve for controlling the delivery flow rate of carbon dioxide, the second carbon dioxide delivery pipeline is provided with a second control valve for controlling the delivery flow rate of carbon dioxide, and a third control valve for controlling the delivery flow rate of the nickel-cobalt-manganese precipitated lean solution is provided between the nickel-cobalt-manganese precipitation tank 7 and the first reaction tank 3. The first reaction tank 3 is externally connected with a first pH online monitor 31, a first 3S-CL-Mn manganese ion online analyzer 33, and a first liquid alkali automatic adding instrument 32, and the second reaction tank 4 is externally connected with a second pH online monitor 41, a second 3S-CL-Mn manganese ion online analyzer 43 and a second liquid alkali automatic adding instrument 42; the first liquid alkali automatic adding instrument 32 and the second liquid alkali automatic adding instrument 42 are provided with valves for controlling the delivery flow rate of the liquid alkali; a pH online monitoring instrument, a 3S-CL-Mn manganese ion online analyzer and a liquid alkali automatic adding instrument are all known devices commonly used in the prior art.

This scheme is further illustrated below by specific examples.

Example 1

A method for recovering manganese from a high-pressure leaching system of laterite nickel ore, including the following steps:

S1. Limestone was added to 100 L of the high-pressure leaching solution of the laterite nickel ore for preneutralization to obtain first-stage carbon dioxide and a neutralization solution, limestone was added in the neutralization solution for precipitation of iron and aluminum to obtain second-stage carbon dioxide and a slurry, and liquid alkali was added to the slurry to adjust the pH value to 7 for precipitation of nickel-cobalt-manganese to obtain nickel-cobalt-manganese hydroxide and 100 L of nickel-cobalt-manganese precipitated lean solution;

S2. First-stage carbon dioxide and second-stage carbon dioxide were collected and passed into a nickel-cobalt-manganese precipitated lean solution, the pH value of the nickel-cobalt-manganese precipitated lean solution was adjusted to 5 by using liquid alkali, and then a precipitation reaction was performed for 30 min to obtain a crude manganese carbonate;

S3. The crude manganese carbonate was dissolved by using sulfuric acid to obtain a dissolution liquid and third-stage carbon dioxide, then calcium and magnesium were removed from the dissolution liquid to obtain 2.5 L of manganese sulfate solution and then evaporated and crystallized to obtain manganese sulfate crystals; the third-stage carbon dioxide was recycled and introduced into a nickel-cobalt-manganese precipitated lean solution; wherein the step of removing calcium and magnesium is as follows:

S31. A P507 extractant was added into the dissolution liquid, saponifying the extractant, wherein the pH value of the saponified extractant was 3, counter-current extraction was performed, and separating was performed to obtain a loaded organic phase, and after washing with a first sulfuric acid having a concentration of 0.03 mol/L to obtain a first organic phase and a calcium sulfate solution;

S32. Reverse extracting was performed on the first organic phase with a second sulfuric acid having a concentration of 0.8 mol/L to obtain a second organic phase and a magnesium sulfate solution;

S33. Reverse extracting was performed on the second organic phase again with a third sulfuric acid having a concentration of 1.5 mol/L to obtain a manganese sulfate solution and a fourth organic phase; recycling the fourth organic phase and passing the same into the dissolution liquid.

Example 2

A method for recovering manganese from a high-pressure leaching system of laterite nickel ore, including the following steps:

S1. Limestone was added to 100 L of the high-pressure leaching solution of the laterite nickel ore for preneutralization to obtain first-stage carbon dioxide and a neutralization solution, limestone was added in the neutralization solution for precipitation of iron and aluminum to obtain second-stage carbon dioxide and a slurry, and liquid alkali was added to the slurry to adjust the pH value to 8 for precipitation of nickel-cobalt-manganese to obtain nickel-cobalt-manganese hydroxide and 100 L of nickel-cobalt-manganese precipitated lean solution;

S2. First-stage carbon dioxide and second-stage carbon dioxide were collected and passed into a nickel-cobalt-manganese precipitated lean solution, the pH value of the nickel-cobalt-manganese precipitated lean solution was adjusted to 6.5 by using liquid alkali, and then a precipitation reaction was performed for 60 min to obtain a crude manganese carbonate;

S3. The crude manganese carbonate was dissolved by using sulfuric acid to obtain a dissolution liquid and third-stage carbon dioxide, then calcium and magnesium were removed from the dissolution liquid to obtain 2.5 L of manganese sulfate solution and then evaporated and crystallized to obtain manganese sulfate crystals; the third-stage carbon dioxide was recycled and introduced into a nickel-cobalt-manganese precipitated lean solution; wherein the step of removing calcium and magnesium is as follows:

S31. A Cyanex272 extractant was added into the dissolution liquid, saponifying the extractant, wherein the pH value of the saponified extractant was 4, countercurrent extraction was performed, and separating was performed to obtain a loaded organic phase, and after washing with a first sulfuric acid having a concentration of 0.05 mol/L to obtain a first organic phase and a calcium sulfate solution;

S32. Reverse extracting was performed on the first organic phase with a second sulfuric acid having a concentration of 1.0 mol/L to obtain a second organic phase and a magnesium sulfate solution;

S33. Reverse extracting was performed on the second organic phase again with a third sulfuric acid having a concentration of 1.8 mol/L to obtain a manganese sulfate solution and a fourth organic phase; recycling the fourth organic phase and passing the same into the dissolution liquid.

Example 3

A method for recovering manganese from a high-pressure leaching system of laterite nickel ore, including the following steps:

S1. Limestone was added to 100 L of the high-pressure leaching solution of the laterite nickel ore for preneutralization to obtain first-stage carbon dioxide and a neutralization solution, limestone was added in the neutralization solution for precipitation of iron and aluminum to obtain second-stage carbon dioxide and a slurry, and liquid alkali was added to the slurry to adjust the pH value to 7.5 for precipitation of nickel-cobalt-manganese to obtain nickel-cobalt-manganese hydroxide and 100 L of nickel-cobalt-manganese precipitated lean solution;

S2. First-stage carbon dioxide and second-stage carbon dioxide were collected and passed into a nickel-cobalt-manganese precipitated lean solution, the pH value of the nickel-cobalt-manganese precipitated lean solution was adjusted to 6 by using liquid alkali, and then a precipitation reaction was performed for 60 min to obtain a crude manganese carbonate;

S3. The crude manganese carbonate was dissolved by using sulfuric acid to obtain a dissolution liquid and third-stage carbon dioxide, then calcium and magnesium were removed from the dissolution liquid to obtain 2.5 L of manganese sulfate solution and then evaporated and crystallized to obtain manganese sulfate crystals; the third-stage carbon dioxide was recycled and introduced into a nickel-cobalt-manganese precipitated lean solution; wherein the step of removing calcium and magnesium is as follows:

S31. A Cyanex923 extractant was added into the dissolution liquid, saponifying the extractant, wherein the pH value of the saponified extractant was 3.5, countercurrent extraction was performed, and separating was performed to obtain a loaded organic phase, and after washing with a first sulfuric acid having a concentration of 0.04 mol/L to obtain a first organic phase and a calcium sulfate solution;

S32. Reverse extracting was performed on the first organic phase with a second sulfuric acid having a concentration of 0.9 mol/L to obtain a second organic phase and a magnesium sulfate solution;

S33. Reverse extracting was performed on the second organic phase again with a third sulfuric acid having a concentration of 1.6 mol/L to obtain a manganese sulfate solution and a fourth organic phase; recycling the fourth organic phase and passing the same into the dissolution liquid.

Example 4

Figure 3:
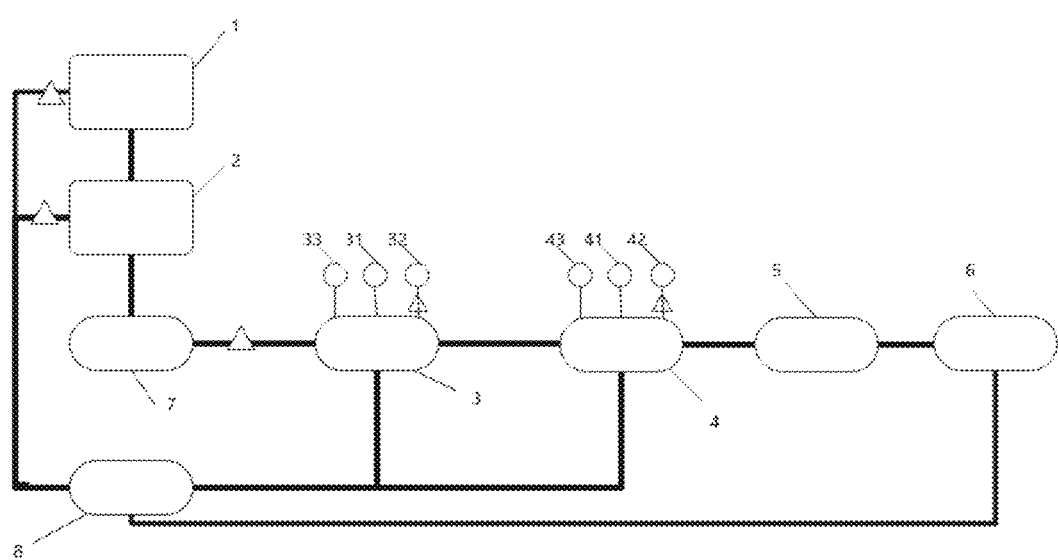
FIG. 3 is a schematic diagram of a system for recovering manganese from a high-pressure leaching system of laterite nickel ore; in the figures, 1. preneutralization tank; 2. Iron-aluminum precipitation tank; 7. nickel-cobalt-manganese precipitation tank; 3. First reaction tank; 4. Second reaction tank; 5. Filter pressing device; 6. Dissolution and impurity removal tank; 8. Carbon dioxide storage tank; 31. First pH online monitor; 33. 3S-CL-Mn manganese ion online analyzer; 32. First liquid alkali automatic adding instrument; 41. Second pH online monitor; 43. Second 3S-CL-Mn manganese ion online analyzer; 42. Second liquid alkali automatic adding instrument.

As shown in FIG. 3, a system for recovering manganese from a high-pressure leaching system of laterite nickel ore includes a carbon dioxide storage tank 8, and a preneutralization tank 1, an iron-aluminum precipitation tank 2, a nickel-cobalt-manganese precipitation tank 7, a first reaction tank 3, a second reaction tank 4, a filter pressing device 5 and a dissolution and impurity removal tank 6 connected in sequence; the carbon dioxide storage tank 8 was connected to the preneutralization tank 1 via first-stage carbon dioxide delivery pipeline, the carbon dioxide storage tank 8 was connected to the iron-aluminum precipitation tank 2 via a second-stage carbon dioxide delivery pipeline, the carbon dioxide storage tank 8 was connected to the dissolution and impurity removal tank 6 via a third-stage carbon dioxide delivery pipeline, the carbon dioxide storage tank 8 was connected to the first reaction tank 3 via a first carbon dioxide delivery pipeline, and the carbon dioxide storage tank 8 was connected to the second reaction tank 4 via a second carbon dioxide delivery pipeline; the first carbon dioxide delivery pipeline was provided with a first control valve for controlling the delivery flow rate of carbon dioxide, the second carbon dioxide delivery pipeline was provided with a second control valve for controlling the delivery flow rate of carbon dioxide, and a third control valve for controlling the delivery flow rate of the nickel-cobalt-manganese precipitated lean solution was provided between the nickel-cobalt-manganese precipitation tank 7 and the first reaction tank 3. The first reaction tank 3 was externally connected with a first pH online monitor 31, a first 3S-CL-Mn manganese ion online analyzer 33, and a first liquid alkali automatic adding instrument 32, and the second reaction tank 4 was externally connected with a second pH online monitor 41, a second 3S-CL-Mn manganese ion online analyzer 43 and a second liquid alkali automatic adding instrument 42; the first liquid alkali automatic adding instrument 32 and the second liquid alkali automatic adding instrument 42 were provided with valves for controlling the delivery flow rate of the liquid alkali.

In the present embodiment, the preneutralization tank 1, the iron-aluminum precipitation tank 2 and the nickelcobalt-manganese precipitation tank 7 were common equipment and devices in the art; the preneutralization tank 1 was used for carrying out the neutralization treatment of the high-pressure leaching solution of the laterite nickel ore, and was provided with an inlet for the high-pressure leaching solution of the laterite nickel ore and an outlet for the neutralization treatment of the pulp; the preneutralization tank 1 differed from the common preneutralization tank 1 in that it was provided with a delivery port for delivering first-stage carbon dioxide to the carbon dioxide storage tank 8; the iron-aluminum precipitation tank 2 was used for implementing the impurity removal process of the neutralization treatment pulp, and was provided with an inlet for the neutralization treatment pulp, an outlet for the iron-aluminum precipitated underflow, and an outlet for the iron-aluminum precipitated solution; the iron-aluminum precipitation tank 2 differed from the common iron-aluminum precipitation tank 2 in that it was provided with a delivery port for delivering second-stage carbon dioxide to the carbon dioxide storage tank 8; the nickel-cobalt-manganese precipitation tank 7 was used for performing a precipitation treatment on the iron-aluminum precipitated solution and extracting nickel-cobalt-manganese hydroxide, and included an inlet for the iron-aluminum precipitated solution, which differed from the common nickel-cobalt-manganese precipitating tank 7 in that it was provided with a delivery port for delivering the nickel-cobalt-manganese precipitated lean solution to the first reaction tank 3. Through the above-mentioned device, a first-stage carbon dioxide released when limestone adjusted pH when removing iron and aluminum was delivered to a carbon dioxide storage tank 8, the limestone in the preneutralization stage consumed carbon dioxide produced by residual acid leached at a high pressure and tail gas carbon dioxide released when a boiler workshop burns lignite to provide steam as a second-stage carbon dioxide was delivered to the carbon dioxide storage tank 8, and then the carbon dioxide was delivered to the first reaction tank 3 via a delivery port of the carbon dioxide storage tank 8 and a compressor; at the same time, the pH of the lean solution after the completion of nickel-cobalt-manganese precipitation was 7-8, so that it enters the first reaction tank 3; since the precipitation pH of manganese carbonate precipitation=5-6.6 and magnesium carbonate precipitation=6.4-8.2, and the precipitation pH of calcium carbonate precipitation=6.2-7.7 were relatively close, it was necessary to strictly control the solution pH, the amount of carbon dioxide bubbling and the amount of liquid alkali, so as to avoid high impurity components in the precipitate caused by excessive alkali, and the first reaction tank 3 could achieve this function; as a buffer tank, the first reaction tank 3 was externally connected with a pH online monitor, a 3S-CL-Mn manganese ion online analyzer 33 and a liquid alkali automatic adding instrument, and according to the pH of the solution, the pH of the solution was maintained at 5-6.5 to avoid excessive entry of impurity ions such as $Ca^{2+}$ and $Mg^{2+}$ into the solid phase; when the pH value of the solution was greater than 6.2, the valve was manually closed for adding liquid alkali and increasing the valve for introducing carbon dioxide into the pipeline; when the solution pH was <6.0, the valve was manually closed for carbon dioxide bubbling into the line and increase the valve for liquid alkali addition. When the conditions in the first reaction tank 3 were adjusted to be stable and balanced, the mixed slurry obtained in the first reaction tank 3 entered the second reaction tank 4, and a precipitation reaction was mainly performed in the second reaction tank 4; the second reaction tank 4 was installed with the same feeding device as the first reaction tank 3; at the same time, the second reaction tank 4 was also externally connected with a pH online monitoring instrument, a 3S-CL-Mn manganese ion online analyzer 33 and a liquid alkali automatic adding instrument for online detection of the content of Mn, so as to ensure that the content of Mn in the liquid phase is >0.35 g/L, and excessively low content of Mn will affect the combination efficiency of Mn and carbon dioxide and reduce the utilization rate of carbon dioxide. When the Mn content in the second reaction tank 4 was less than 0.35 g/L, then the transfer rate of the slurry in the second reaction tank 4 to the filter pressing device 5 was accelerated, and at the same time, the addition amount of the nickel-cobalt-lean solution was increased via the nickel-cobalt-manganese precipitation tank 7 to increase the Mn content, and finally the slurry entered the filter pressing device 5 to prepare a crude manganese carbonate product; the dissolution and impurity removal tank 6 was in communication with the filter pressing device 5 for receiving the crude manganese carbonate product, and after adding the dissolution liquid therein, the third-stage carbon dioxide produced were input to the carbon dioxide storage tank 8.

Comparative Example 1

A method for recovering manganese from a high-pressure leaching system of laterite nickel ore, including the following steps:

Limestone was added to 100 L of the high-pressure leaching solution of the laterite nickel ore for preneutralization to obtain first-stage carbon dioxide and a neutralization solution, limestone was added in the neutralization solution for precipitation of iron and aluminum to obtain second-stage carbon dioxide and a slurry, and liquid alkali was added to the slurry to adjust the pH value to 7 for precipitation of nickel-cobalt-manganese to obtain nickel-cobalt-manganese hydroxide and 100 L of nickel-cobalt-manganese precipitated lean solution and the first-stage carbon dioxide and the second-stage carbon dioxide were discharged.

The liquid phases finally obtained in Examples 1 to 3 and Comparative Example 1 were subjected to composition tests and compared with the composition of the high-pressure leaching solution of the raw material laterite nickel ore, and the results were shown in Table 1.

TABLE 1

| | Composition test results | | | | | | | | |
|---|---|---|---|---|---|---|---|---|---|
| Item | Ni | Co | Mn | Mg | Ca | Fe | Al | Cr | Cu |
| High-pressure leaching solution of laterite nickel ore (content: g/L) | 6.52 | 0.584 | 4.14 | 5.23 | 0.227 | 3.56 | 8.64 | 0.473 | 0.051 |
| Example 1 (content g/L) | 0 | 0 | 54.36 | $5.24*10^{-5}$ | $1.3*10^{-5}$ | 0 | 0 | 0 | 0 |
| Example 2 (content g/L) | 0 | 0 | 50.37 | $0.68*10^{-5}$ | $0.74*10^{-5}$ | 0 | 0 | 0 | 0 |

TABLE 1-continued

| | Composition test results | | | | | | | | |
|---|---|---|---|---|---|---|---|---|---|
| Item | Ni | Co | Mn | Mg | Ca | Fe | Al | Cr | Cu |
| Example 3 (content g/L) | 0 | 0 | 52.74 | $3.4*10^{-5}$ | $0.97*10^{-5}$ | 0 | 0 | 0 | 0 |
| Comparative Example 1 (content g/L) | 0.002 | 0.005 | 1.39 | 5.24 | 0.510 | 0 | 0 | 0 | 0 |

It can be seen from the above results that the liquid phase obtained in the disclosure is a manganese sulfate solution, the contents of manganese are all higher than >50 g/L, and the contents of calcium and magnesium are all $<1*10^{-4}$ g/L, while the liquid phase of comparative example 1 contains a large number of impurities such as manganese, calcium and magnesium, and the recovery effect of manganese is poor and the purity is low.

Although the preferred embodiments of the disclosure have been disclosed for illustrative purposes, those skilled in the art will appreciate that various modifications, additions, and substitutions are possible, without departing from the scope and spirit of the invention as disclosed in the accompanying claims.

What is claimed is:

1. A method for recovering manganese from a high-pressure leaching system of laterite nickel ore, comprising the following steps:
    S1. adding limestone to the high-pressure leaching solution of the laterite nickel ore for preneutralization to obtain first-stage carbon dioxide and a neutralization solution, adding limestone in the neutralization solution for precipitation of iron and aluminum to obtain second-stage carbon dioxide and a slurry, and adding liquid alkali to the slurry for precipitation of nickel-cobalt-manganese to obtain nickel-cobalt-manganese hydroxide and a nickel-cobalt-manganese precipitated lean solution;
    S2. collecting first-stage carbon dioxide and second-stage carbon dioxide and passing same into the nickel-cobalt-manganese precipitated lean solution, adjusting the pH value of the nickel-cobalt-manganese precipitated lean solution to 5-6.5 by using liquid alkali, and then performing a precipitation reaction to obtain a crude manganese carbonate; and
    S3. dissolving the crude manganese carbonate by using sulfuric acid to obtain a dissolution liquid and third-stage carbon dioxide, then removing calcium and magnesium from the dissolution liquid to obtain a manganese sulfate solution and then evaporating and crystallizing to obtain manganese sulfate crystals; recycling the third-stage carbon dioxide and introducing same into a nickel-cobalt-manganese precipitated lean solution.

2. The method for recovering manganese from a high-pressure leaching system of laterite nickel ore according to claim 1, wherein in step S3, the step of removing calcium and magnesium is as follows:
    S31. adding an extractant into the dissolution liquid to perform counter-current extraction, and separating to obtain a loaded organic phase, and after washing with a first sulfuric acid to obtain a first organic phase and a calcium sulfate solution;
    S32. reverse extracting the first organic phase with a second sulfuric acid to obtain a second organic phase and a magnesium sulfate solution; and
    S33. reverse extracting the second organic phase again with a third sulfuric acid to obtain a manganese sulfate solution and a fourth organic phase; recycling the fourth organic phase and passing the same into the dissolution liquid for counter-current extraction.

3. The method for recovering manganese from a high-pressure leaching system of laterite nickel ore according to claim 2, wherein the extractant comprises one or more of P507, P204, Cyanex272, Cyanex923, TBP, and P350.

4. The method for recovering manganese from a high-pressure leaching system of laterite nickel ore according to claim 2, wherein the concentration of the first sulfuric acid is 0.03 to 0.05 mol/L, the concentration of the second sulfuric acid is 0.8 to 1.0 mol/L, and the concentration of the third sulfuric acid is 1.5 to 1.8 mol/L.

5. The method for recovering manganese from a high-pressure leaching system of laterite nickel ore according to claim 2, wherein a pH of the liquid phase after the counter-current extraction in step S31 is 3-4.

6. The method for recovering manganese from a high-pressure leaching system of laterite nickel ore according to claim 2, further comprising saponifying the extractant prior to counter-current extraction.

7. The method for recovering manganese from a high-pressure leaching system of laterite nickel ore according to claim 1, wherein a pH of the nickel-cobalt-manganese precipitated lean solution in step S1 is of 7-8.

8. The method for recovering manganese from a high-pressure leaching system of laterite nickel ore according to claim 1, wherein the precipitation reaction time is 30 to 60 min.

* * * * *